United States Patent
Zwick et al.

(12)

(10) Patent No.: US 6,352,787 B1
(45) Date of Patent: Mar. 5, 2002

(54) METHOD FOR PRODUCING AN INSULATING PACK FOR AN INSULATING PART

(75) Inventors: Evelyn Zwick, Ebmatingen; Alexander Wildhaber, Walenstadt, both of (CH)

(73) Assignee: Rieter Automotive (International)AG, Zollikon (CH)

(*) Notice: Subject to any disclaimer, the term of this patent is extended or adjusted under 35 U.S.C. 154(b) by 0 days.

(21) Appl. No.: 09/582,530

(22) PCT Filed: Dec. 23, 1998

(86) PCT No.: PCT/CH98/00551

§ 371 Date: Jun. 28, 2000

§ 102(e) Date: Jun. 28, 2000

(87) PCT Pub. No.: WO99/34974

PCT Pub. Date: Jul. 15, 1999

Related U.S. Application Data

(60) Provisional application No. 60/070,188, filed on Dec. 30, 1997.

(51) Int. Cl.[7] .......... B32B 15/01; B32B 7/04; F16L 59/08; B23K 20/00; B23K 20/02
(52) U.S. Cl. .......... 428/594; 428/596; 428/603; 228/3.1; 228/13; 228/115; 228/190
(58) Field of Search .......... 228/3.1, 190, 115, 228/13, 160, 141.1; 428/593, 596, 594, 603; 29/505, 428

(56) References Cited

U.S. PATENT DOCUMENTS

| | | | | |
|---|---|---|---|---|
| 2,763,057 A | * | 9/1956 | Clair | 29/470.1 |
| 2,776,473 A | * | 1/1957 | Dailey et al. | 29/475 |
| 2,894,323 A | * | 7/1959 | Sowter et al. | 29/481 |
| 3,702,021 A | * | 11/1972 | Wolfe et al. | 29/157.3 D |
| 3,702,022 A | * | 11/1972 | Duke et al. | 29/157.3 D |
| 3,786,559 A | * | 1/1974 | Smith | 29/470.1 |
| 4,319,708 A | * | 3/1982 | Lomerson | 228/111 |
| 4,499,708 A | * | 2/1985 | Lewandowski et al. | 53/432 |
| 4,545,108 A | * | 10/1985 | Adams et al. | 29/570 |
| 5,011,743 A | | 4/1991 | Sheridan et al. | 428/600 |
| 5,603,449 A | * | 2/1997 | Mansbridge et al. | 228/157 |
| 5,670,264 A | * | 9/1997 | Sheridan | 428/594 |
| 5,884,832 A | * | 3/1999 | Funamoto et al. | 228/13 |
| 5,939,212 A | * | 8/1999 | Ragland et al. | 428/594 |

FOREIGN PATENT DOCUMENTS

| | | | | |
|---|---|---|---|---|
| DE | | 4329411 A1 | * 5/1994 | |
| WO | WO 91/10560 | | 7/1991 | B32B/3/28 |

* cited by examiner

*Primary Examiner*—John J. Zimmerman
(74) *Attorney, Agent, or Firm*—Nath & Associates PLLC; Gary M. Nath; Marvin C. Berkowitz

(57) ABSTRACT

The invention relates to a method for producing an insulating pack (10), according to which a stack (9) of metallic lamellae is cold-welded simultaneously along a predefined contour and separated from a remaining area. The insulating pack produced according to the invention preferably has a plurality of knobbed and/or perforated aluminium foils (12, 14, 16) and at least one stretch film (18) and is characterized by a narrow welding seam (20) extending along the edge. The insulating pack can be used as an insulating part on its own or loosely inserted into an additional supporting or covering layer. Such insulating parts can be configured in an acoustically active manner and are used in the motor industry, machine industry and/or electronic or computer industry. Means for carrying out the method provided for in the invention provide for the use of a cutting blade with two cutting flanks. A preferred version of the cutting blade has cutting flanks inclined at different angles and can be configured as a rotary blade.

18 Claims, 3 Drawing Sheets

METHOD FOR PRODUCING AN INSULATING PACK FOR AN INSULATING PART

This application is a 35 U.S.C. § 371 of International Application PCT/CH98/00551 which is a continuation of application Ser. No. 60/070,188 filed Dec. 30, 1997, now abandoned, entitled Laminated Shield and a Method of Making the Shield.

FIELD OF THE INVENTION

The present invention relates to a method for manufacturing an insulating pack for an insulation part in particular for a heat shield, the insulating pack having at least two stacked metallic sheets; to an insulating pack manufactured therewith in particular a heat shield, with several stacked, metallic sheets; as well as to a separating tool for carrying out the method, the separating tool having two separating flanks, the separating flanks having different angles to a contact surface.

BACKGROUND OF THE INVENTION

In the motor vehicle industry, as well as in other technical fields, there exists a requirement for thin thermic insulation parts which may be adapted to their application purpose in a simple manner. It is therefore desirable to be able to economically manufacture such insulating parts, in particular thin heat shields, which may be brought into the desired shape in a simple manner. Known insulation parts are constructed of a stack of several aluminium foils or aluminium sheet metals. Such insulation parts find an increasing application with heat shields for vehicles.

Such a heat shield is for example disclosed in U.S. Pat. No. 5,011,743 and its corresponding application WO 91/10560. These documents disclose a foil package which comprises heat-conducting zones, so called heat sinks, and heat-insulating zones. In particular these foils comprise embossings or naps which result in the stacked foils being distanced from one another. The individual foils may be connected to one another in a hermetically sealed manner, by which means the enclosure of a gas e.g. xenon is made possible. In a further embodiment of this invention the individual foils are perforated for improving the acoustic effectiveness. The edge regions of this foil package are in practice pressed together with a considerable pressure force and are cut in separate method steps, and are subsequently crimped, heat sealed or mechanically connected. With these known foil packages, and due to mechanical strain which is, for example, exerted during transport or during operation, the foils may separate again in the connection region.

The above described insulating pack or heat shield has a number of disadvantages. One disadvantage which becomes obvious to the man skilled in the art lies in the fact that heat flows through the heat sink regions onto the other side of the insulation part and on account of the relatively wide border regions, the proportion of the effective insulation surface on the whole heat shield is undesireably reduced. Furthermore, the conventional manufacture of such heat shields has shown to be complicated with respect to tooling. On account of the sharp points occurring when using stretch sheet metal and the high risk of injury to personnel related to this, such stretch sheet metal is not applied.

SUMMARY OF THE INVENTION

It is therefore the aim of the present invention to provide an inexpensive method, i.e. simple with respect to tooling, for manufacturing an insulating pack or pad for an insulation part or a heat shield, which permits in as few operating steps as possible a processing-friendly and safe heat shield to be manufactured from a stack of metallic sheets, wherein the individual sheets of this stack in their edge regions are firmly connected to one another, without at the same time heat sinks being formed.

In the following metallic sheets are to be understood in general being extended metal parts. These extended metal parts may have differing thicknesses, may be perforated or have a particular structure. In particular these are to be understood as perforated (having holes or being fissured) or unperforated foils, thin metal sheets or metal sheeting, foils in the form of stretch metal grids, stretch foils, metal knittings, metal weavings, metal tissue or similar surfaced structures. These sheets may also be coated or comprise honeycomb-like deformation patterns (honeycomb-sheet-metal) or may be shaped in a different manner, in particular may be napped.

This aim is achieved according to the invention by cold welding or metallurgically connecting, with the aid of a separating knife, a predetermined region of stacked metallic sheets along a contour of the region whilst forming a continuous welding seam and simultaneously separating the stacked metallic sheets from a residual region, and in particular by a method for manufacturing an insulating pack with a stack of several metallic sheets, which may be embossed and/or perforated, and with this method the individual sheets of the stack are continuously cold-welded in their peripheral region and at the same time are separated from the residual material. Cold-welding in the following is to be understood as a metallurgical connection or bonding which is achieved by means of a plastic deformation of two or more neighbouring sheets, and with this deformation the metallic material of neighbouring sheets integrally connects. With aluminium such a connection may be achieved when the material is compressed for example by approx. 75%.

With the method according to the invention at least two metal sheets are stacked, wherein individual sheets may be embossed. According to the invention, the stack produced in such a manner is cold-welded along a predetermined contour and at the same time is separated from the cutting waste. This is preferably achieved with a mould press equipped with a suitable separating tool. It is to be understood that this cold-welding of the stack periphery and the separation of the individual sheets of the stack may also be accomplished with other suitable separating tools.

Furthermore with this cold-welding method an insulating pack consisting of a multitude of differing (for example napped, holed, or grid-like) sheets, foils or sheet metals may be manufactured. With the application of stretch metal sheeting, edges may be produced which do not have any sharp points. The method according to the invention furthermore permits insulating packs to be deformed in a suitable manner. In particular, the application of stretch-metal-like sheets, in contrast to s perforated sheets, has proven to be particularly advantageous, since such stretch metal sheets are lighter, more easily deformable and tear less easily. Furthermore the acoustic effectiveness of these stretch-metal-like sheets may be controlled or adjusted in a simple manner by the formation of differently large openings.

It is further the aim of the present invention to provide an acoustically effective insulating pack, in particular a heat shield with a stack of metallic sheets, which overcomes the above cited deficiencies, wherein the individual sheets of this stack in their edge regions are firmly connected to one another, without at the same time heat sink regions being produced. Furthermore an insulating pack is to be provided which may be deformed in a simple manner without at the same time becoming damaged or separating during transportation or use.

According to the invention this aim is achieved by an insulating pack or pad with several stacked, metallic sheets, having a continuous cold-weld seam along its contour, and in particular by an insulating pack in which the individual sheets of the stack are cold-welded to one another along their common edges. In one preferred embodiment of this insulating pack the cold-weld seam is approx. 0.3 mm wide. In another particular embodiment the insulating pack comprises at least one stretch sheet metal. In another particular embodiment the insulating pack is provided with at least one fold line in order to permit a strong deformation of the whole insulation package in a simple manner; and in yet another particular embodiment at least one of the metallic sheets of the insulating pack is napped and/or perforated.

In a preferred embodiment of the present invention the insulating pack or heat shield comprises a plurality of aluminium foils which are cold-welded to each other along their respective edges. With these cold-welded foils a peripheral connection is produced which is substantially more stable than the embossing or adhesing methods which are disclosed in the state of the art, for example in U.S. Pat. No. 5,011,743. The inventive insulating pack is welded only along its edge or peripheral regions, which ensures good heat insulating properties over the entire inner region.

In a preferred embodiment the insulating pack comprises a multitude of stacked metal foils, as well as a carrier sheet metal and a cover foil or a cover sheet metal. With this embodiment the carrier sheet metal consists of a stretch metal or a perforated sheet metal. In a particular embodiment the invention comprises a foil stack, with which the individual foils are perforated and are fastened on a perforated carrier sheet metal. According to the invention with all these embodiments at least the foils of the foil stack are cold-welded to one another. It is however to be understood that the foils of the foil stack may also be cold-welded directly to the carrier sheet metal and/or to the cover foil.

It is an additional aim of the present invention to provide suitable means for carrying out the method according to the invention.

According to the present invention this additional aim is achieved by use of a separating knife, and in particular by use of a separating knife, whose separating flanks preferably inclined to a differing degree to the separating plane. In a particularly preferred embodiment a first separating flank is at an acute angle of approx. 60° to the contact surface and a second separating flank is at a less acute angle of approx. 25° to the contact surface. A further embodiment of this separating knife is formed as a round knife.

By applying a separating tool it is possible to produce such a cold-welding along the edges of the stack of metallic sheets. In this way the individual sheets are simultaneously connected to one another and brought into a special contour.

A particularly advantageous formation of the separating tool comprises a separating knife which has an acute angle of preferably 60° between a first separating flank and the cold-welding plane and which separating knife has an acute angle of preferably 25° between a second separating flank and the cold-welding plane in such a manner that between the two separating flanks of the separating knife there is formed an obtuse angle of, for example, 95°.

The inventive application or use of cold-welding has proven to be considerably advantageous with respect to known methods for connecting the individual sheets of a stack, inasmuch as such cold welding can be carried out considerably more simply and quickly, as well as more economically and safely. When this cold-welding method is combined with a separating step, the number of method steps for manufacturing such insulating packs can be considerably reduced as compared to conventional methods (in particular as compared to complicated crimping methods).

The insulating pack according to the invention does not have any disadvantageous heat sinks but rather comprises an extremely narrow region in which the individual sheets have an integral connection to another and thus in a reliable and long lasting manner. Furthermore, the insulating packs manufactured according to the invention, and even when using stretch-metal-like sheets, do not have any sharp points and may be folded into any desired shape at their fold lines, without at the same time tearing, breaking or coming apart at their edge regions. Furthermore the geometric course of the cold-welded connection may be shaped in any manner, i.e. as a serpentine line or complementarily to the geometric course of the edge region of a neighbouring insulating pack, and in particular a heat shield which is to be manufactured from the same sheets. In particular, it is thus possible to minimise the cutting waste during manufacture of these insulating packs.

The above mentioned subject-matter of the invention and further formations, advantages and characteristics of the invention in the following are explained by way of example by way of the drawings or may be evidently deduced from the following description of the preferred embodiments.

DETAILED DESCRIPTION

Figure 1:
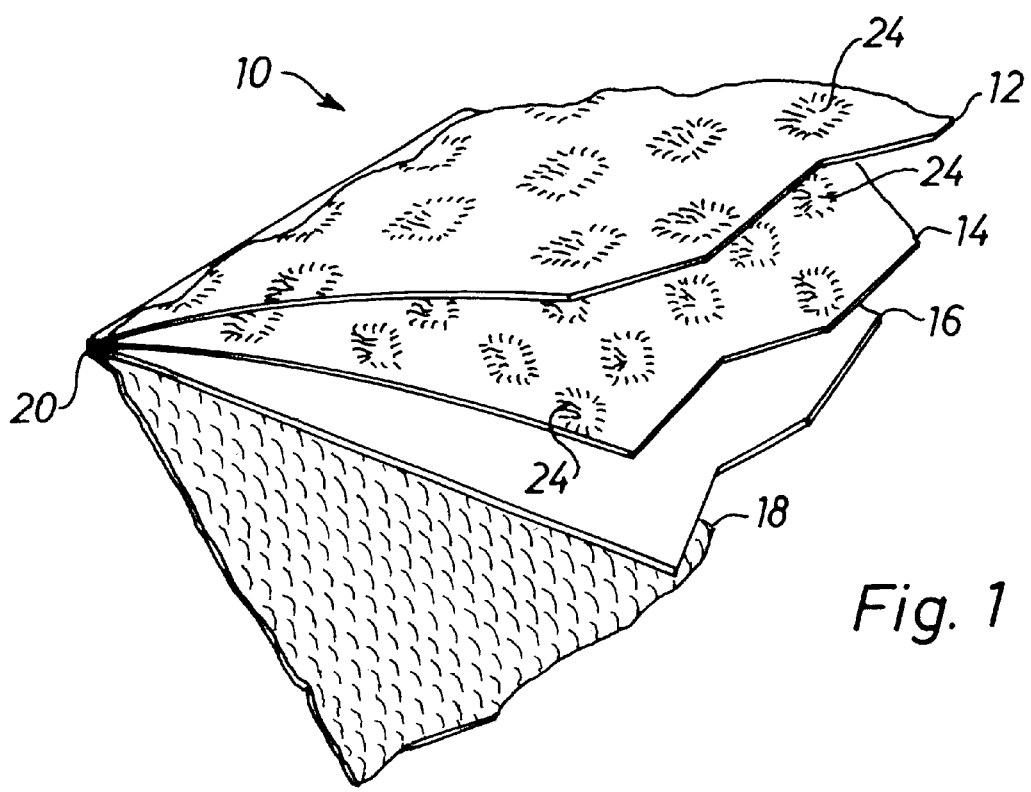
FIG. 1 shows in a perspective view one embodiment of a stack of metallic sheets connected according to the invention.
Figure 2:
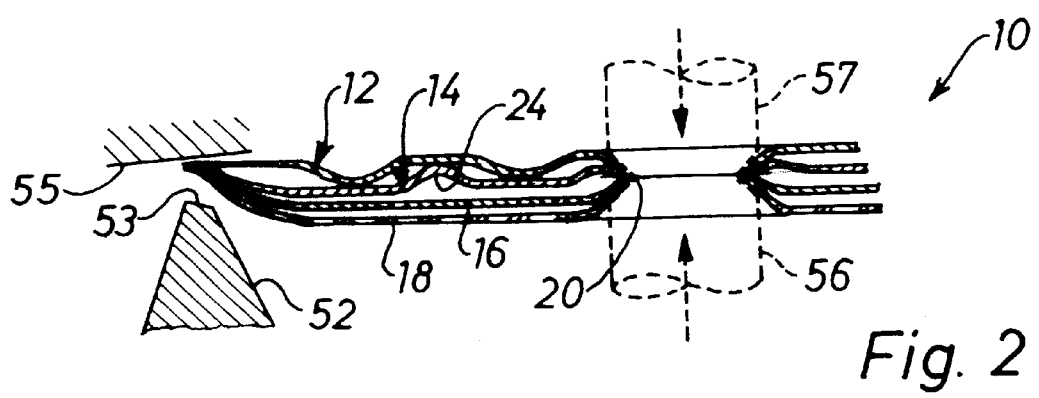
FIG. 2 shows a view of a stack according to the invention in cross section, during the cold welding process.
Figure 3:
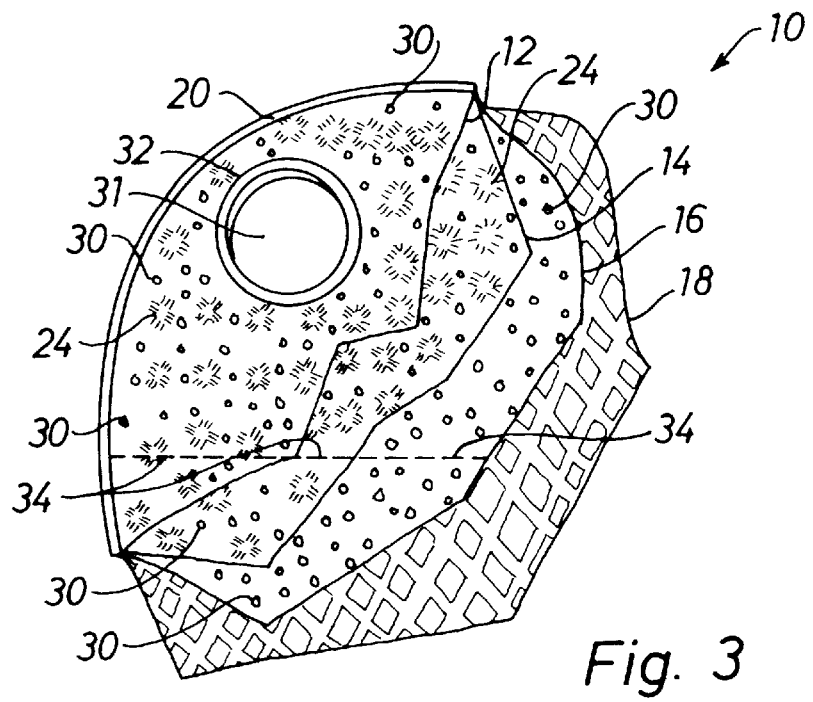
FIG. 3 shows a plan view of a stack which has been cold-welded and separated according to the invention.

In FIGS. 1 to 3, in which the same components are provided with the same reference numerals, a multi-layered insulating pack 10 for an insulation part or heat shield is shown. Here it is to be noted that in the Figures the individual sheets are not shown to scale. The insulating pack 10 is applied preferably to the lower floor region of vehicles, and in particular as an acoustically effective heat shield. Such insulating packs may comprise additional carrier, intermediate or cover layers. With known embodiments, perforated carrier sheet metals, knitted intermediate layers or flame sprayed cover layers are used. Insulation parts are also known in which the insulating packs are loosely arranged between a carrier sheet metal and a cover foil.

The insulating pack 10 comprises a multitude of metallic sheets, which in the formation shown in FIG. 1 comprise an upper embossed or napped foil 12 with naps 24, an embossed intermediate foil 14, likewise with naps 24, a flat or unembossed foil 16 and a stretch foil 18. This stretch foil may have carrier functions and is easily deformable. Instead of such a stretch foil 18 also a perforated plate of a known type may be provided. All sheets of this insulating pack 10 have in the plan view the same contour and are connected metallurgically to one another, i.e. with an integral connection at their common edges by way of a cold-welding process. This metallurgic connection leads to a circumferential, continuous integral welding seam 20.

In FIG. 1 it is made clear that by way of the cold welding of the individual sheets there is formed a fine welding seam 20 which does not have sharp edges and thus also permits the use of stretch-metal-like sheets or thin stretch sheet metals. This welding seam 20 is approx. 0.3 mm wide and differs significantly from the known, approx. 7 mm wide squeezed, compressed or crimped edges.

The insulating packs shown in FIGS. 2 and 3 have essentially the same sequence of foils as in FIG. 1. The foils of this insulating pack 10 in FIG. 3 all comprise a multitude of perforations 30, in order thus to improve the acoustic effectiveness of the insulating packs. In the embodiments shown in these FIGS. 2 and 3, the insulating pack 10 comprises a recess 31 arranged in the inside for purposes of securing the same, the edge 32 of which is formed by a weld seam. With the method according to the invention the recess 31 is produced by creating a cold-welded seam 20 and simultaneously separating the respective sheet regions A, B. In a preferred embodiment the insulating pack 10 is simultaneously provided with predetermined fold lines 34, consisting of continuously running notches and/or partially running incisions.

According to the invention the individual sheets are selected from a material which, when pressure is applied, may be plastically deformed in such a manner that the individual layers metallurgically connect under pressure. As a working material it is preferable to use aluminium with a thickness of approx. 50 $\mu$m, although also other metals or alloys, or different thicknesses may be used, such as for example steel sheet metal, copper or gold. Accordingly, in the described embodiment the stretch-metal-like foil or the perforated carrier sheet metal is preferably made of aluminium.

The embossed or napped foils 12 and 14 may be manufactured in a conventional shaping roller, wherein by way of the embossing a multitude of naps 24 are formed as are shown in FIG. 2. These naps 24 space the individual foils from one another and lead to an insulating and acoustically effective air space between the individual foils.

The stretch-metal-like foil 18 and the embossed or napped foils 12 and 14 separate the individual foils from one another in a manner such that any heat transfer which occurs on account of a direct metallic contact is minimised and thus a good heat insulation is achieved. The use of a stretch foil 18 or a perforated plate leads to an improvement of the acoustic absorption capability of the insulating pack.

Although the insulating pack 10 with foils 12, 14, 16 and 18 is shown in a certain arrangement or sequence, it is to be understood that other arrangement combinations are evident to the man skilled in the art. For example, additional embossed foils, additional stretch foils or intermediate layers of a known type may be used. It is within the skill of the expert to so select these individual sheets and their perforation openings or their thickness that the required properties may be used in an optimal manner.

Cold-welding methods are essentially known to the man skilled in the art but, however, are not known for use in mould pressing tools. In the method according to the invention the metal sheets to be metallurgically connected are exposed to such a high pressure that their surface layers enter into an integral connection with one another. In a preferred embodiment of the present invention, a suitable steel tape acting as a separating knife 51 and having a width of approx. 1 mm is applied into a mould pressing tool. This separating knife 51 is inserted in such a manner that it follows the desired contour of the insulating pack to be manufactured. For producing a cold welding seam 20 according to the invention, and as can be seen from FIG. 2, the separating flanks 52 and 53 of this separating knife 51 are arranged preferably asymmetrically. In particular, the separating flank 53 which faces the insulating pack 10 to be manufactured runs at a narrower angle than the separating flank 52 facing away from the insulating pack 10 to be manufactured. The result of this geometric arrangement of the separating flanks is, that on closing the mould pressing tool the metallic sheets lying under the separating flank 53 are metallurgically connected or bonded to one another and are separated in the region of the separating edge 54. In an analogous manner, tool parts 56 and 57 can be provided such that with these tool parts a hole 31 is cut out of the insulating pack 10 and, at the same time, the edge of the hole is cold welded to form a circumferential welding seam 20. A suitable pressure force lies in the region of 1.7 kN per 10 mm edge length. This corresponds to 17 tons pressure force on an edge length of 1 meter. With a form pressing tool of approx. 1600×900 mm$^2$, with which several insulating packs having a total edge length of about 10 to 20 m may be manufactured simultaneously, a pressure force of up to 340 tons is therefore required. This pressure force may be considerably reduced by increasing the closing speed of the press, which can also increase the longevity of the separating knife. In order to be able to automatically decollate surface portions A, B which have previously been separated from one another, a pressurised air tool of any known type may be used.

The insulating packs manufactured in such a way may be used as an acoustically effective heat shield and in particular are mounted in the region between hot vehicle parts (catalytic converter, exhaust pipe, etc.) and the vehicle floor. It is to be understood that these insulating packs may also be arranged between the engine compartment and the passenger compartment.

Figure 4:
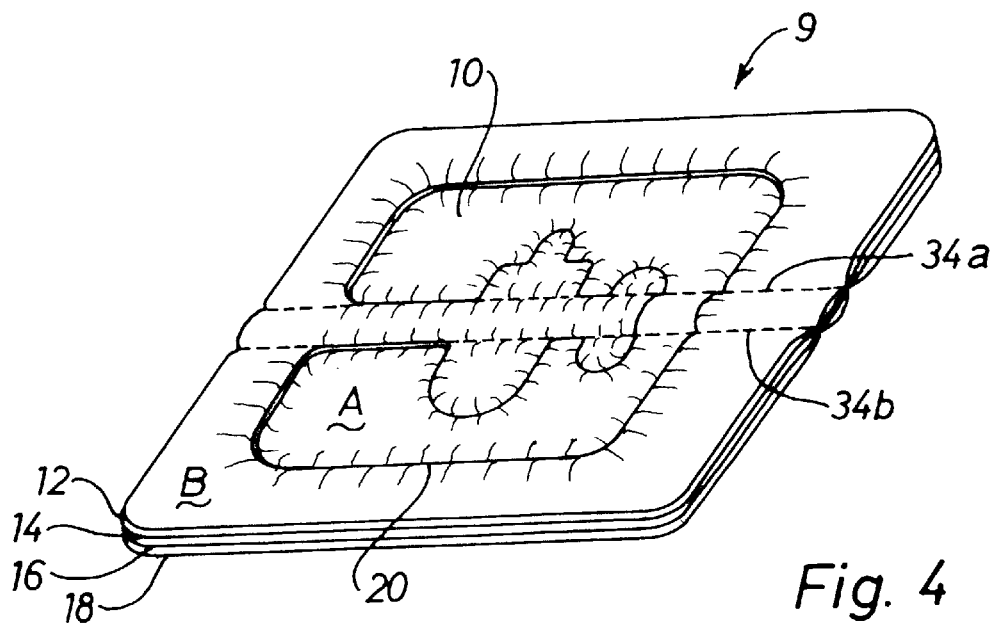
FIG. 4 shows a view of a particular shape of an insulation package according to the invention.

FIG. 4 shows a metal sheet stack 9 which has been welded and separated according to the invention, and which has two fold lines 34a and 34b. This stack comprises a region A, which is not yet decollated, i.e. which still rests in the residual region B which is to be removed. During the manufacture of an insulating pack 10 this residual region B remains as trimming waste. With this metal sheet stack 9 a key-hole-shaped region is separated along a weld seam 20. This particular shaping permits the finished insulating pack to be inserted or slipped over a lead which has already been mounted in the vehicle, such as, for example, an electric cable or a hose. By way of a Z-like folding of the insulating pack 10 along the fold lines 34a, 34b, the insulating pack 10 forms a hole-shaped opening through which the mounted lead may be guided. Depending upon the intended use of the insulating pack the expert may shape other suitable fold lines and package shapes, in particular groove-shaped or tubular coverings. The use of stretch-metal type or napped metal sheets is suitable in particular for such extremely deformed insulation parts.

In the following, and with the aid of FIGS. 5, 6a and 6b, suitable methods and means for manufacturing insulating packs are described, in which a selected metal sheet stack 9 is cold-welded along a predetermined contour and at the same time is separated.

Figure 5:
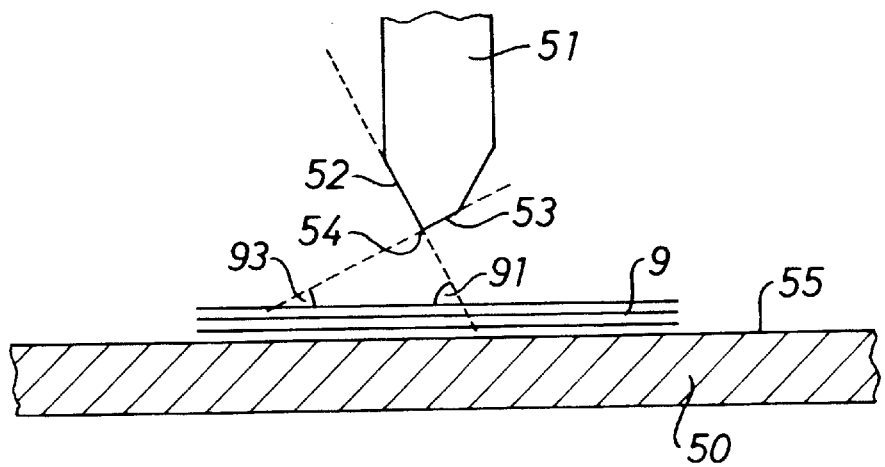
FIG. 5 shows means for carrying out the method of manufacturing an insulating pack according to the invention.

In a preferred embodiment as is shown in FIG. 5, the metal sheets or foils selected and napped in a suitable manner are stacked on one another and inserted into a form pressing tool. This form pressing tool comprises a lower hard forming half 50 and an upper forming half having a separating knife 51. The separating knife 51 is formed in a particular manner in order to weld and separate an inserted metal sheet stack in a manner according to the invention. This separating knife comprises preferably a first separating flank 52 which with the contact surface 55 formed by the lower hard forming half 50 forms an acute angle 91, preferably of 60°. The separating knife 51 also comprises a second separating flank 53 which together with the contact surface 55 forms an acute angle 93, preferably of 25°. The first and the second separating flanks form a separating edge 54. It is to be understood that for carrying out the method according to the invention also a separating knife with symmetrically arranged flanks being inclined at 45° to the contact surface may be used.

In the method according to the invention the separating knife is pressed on the contact surface 55 such that the sheets lying therebetween are plastically deformed and thereby metallurgically connect or bond. With this plastic deformation the metallic material yields away from the region of the separating flank 53 and flows between the separating flank 53 and the contact surface 55. With the impinging of the separating knife 51 onto the lower hard forming half the material thus welded is separated along the separating edge 54.

Figure 6A:
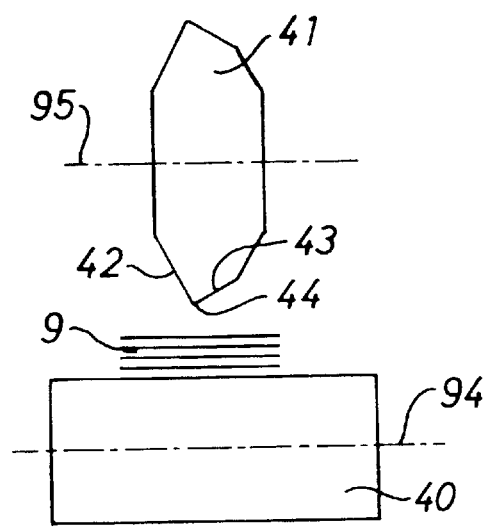
FIG. 6 shows further means for carrying out the method according to the invention.

FIG. 6a schematically shows particular means for carrying out the method according to the invention. With this, instead of the lower forming half a suitable hard roller 40 is used, which is rotatable about an axis 94. With this arrangement, instead of the linear separating knife 51 a round or disk-shaped separating knife, or round knife 41 is used, which is rotatable about an axis 95 and whose separating flanks 42, 43 or separating edge 44 are bent in an analogous manner. This embodiment permits the present method for cold-welding and separating insulating packs to be automised in a simple manner.

Figure 6B:
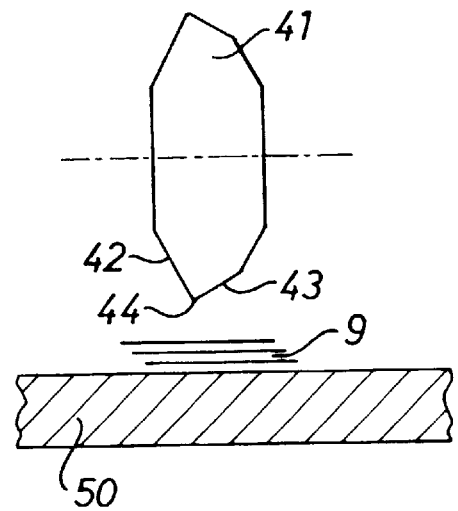

In FIG. 6b a further possible embodiment of a separating means for carrying out the method according to the invention is schematically shown. This also comprises a round knife 41 whose separating flanks 42, 43 are formed preferably asymmetrically. In this embodiment the round knife 41 is pressed onto a plane, hard base 50.

It is to be understood that the insulating part according to the invention may not only be used in the vehicle industry, but generally also as an insulating pack in the engineering industry for insulating heat and noise producing machines, in heat and cooling technology or in the computer or electronics industry.

What is claimed is:

1. A method for manufacturing an insulating pack for an insulation part, said insulating pack comprising at least two stacked metallic sheets, comprising the following steps:
    defining a desired first region of stacked metallic sheets to form the insulating pack;
    cold welding or metallurgically connecting each of the stacked metallic sheets to another of the stacked metallic sheets along a contour of said first region between first and second halves of a separating tool, the first half having a separating knife having two asymmetric separating flanks, said separating flanks being disposed at different angles relative to a contact surface of the second half;
    forming a continuous welding seam; and
    simultaneously separating said first region from a residual region of said stacked metallic sheets.

2. A method according to claim 1, further comprising simultaneously providing the insulating pack with fold lines in the form of continuously running notches or partially running incisions.

3. A method according to claim 2, characterised in that, several complementarily contoured metallurgically connected insulating packs are manufactured simultaneously from the stacked metallic sheets and simultaneously separated along a common cutting line in order thus to minimize an amount of residual material.

4. An insulating pack manufactured according to the method of claim 1, comprising:
    a plurality of stacked metallic sheets;
    a continuous cold-weld seam along a contour of a first region thereof that connects each sheet of said plurality of stacked metallic sheets to another of said plurality of sheets; and
    a residual region opposite said first region and separated therefrom on a side of a cutting line defined by said cold-weld seam, said residual region having an un-welded edge adjacent to said cold-weld seam.

5. An insulating pack according to claim 4, characterised in that the cold-weld seam is approximately 0.3 mm wide.

6. An insulating pack according to claim 4, characterised in that said insulating pack further comprises at least one stretch sheet metal.

7. An insulating pack according to claim 4, characterised in that said insulating pack further comprises at least one fold line.

8. An insulating pack according to claim 4, characterised in that at least one of the metallic sheets is napped or perforated.

9. A separating tool for carrying out the method according to claim 1, characterised in that said separating tool comprises a separating knife with two asymmetric separating flanks, said separating flanks having different angles to a contact surface of a lower forming half of said separating tool.

10. A separating tool according to claim 9, characterised in that the separating knife is a circular, disk-shaped knife.

11. The method according to claim 1 wherein said step of separating said first region from said residual region occurs in a portion of said residual region lying between a first separating flank and said contact surface.

12. The method according to claim 1 wherein said step of cold welding or metallurgically connecting occurs in a portion of said first region lying between a second separating flank and said contact surface.

13. The method according to claim 1 wherein said insulating pack is a heat shield.

14. The method according to claim 1, further comprising simultaneously providing the insulating pack with fold lines in the form of continuously running notches and partially running incisions.

15. The method according to claim 4 wherein said insulating pack is a heat shield.

16. An insulating pack according to claim 4, characterised in that at least one of the metallic sheets is napped and perforated.

17. The separating tool as claimed in claim 9 wherein a first separating flank lies at an acute angle of approx. 60° to the contact surface and a second separating flank lies at a less acute angle of approx. 25° to the contact surface.

18. The separating tool as claimed in claim 10, wherein the separating knife is rotatable about an axis.

* * * * *